United States Patent
Makino et al.

(10) Patent No.: US 6,685,572 B2
(45) Date of Patent: *Feb. 3, 2004

(54) POWER TRANSMISSION MECHANISM (75) Inventors: Hiroaki Makino, Shizuoka (JP); Kazuhiro Muramatsu, Fukuroi (JP); Kazuhiko Yoshida, Fukuroi (JP); Akira Wakita, Iwata (JP); Katsuyuki Ikei, Fukuroi (JP); Hisaaki Kura, Iwata (JP)

(73) Assignee: NTN Corporation, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/508,120

(22) PCT Filed: Jul. 15, 1999

(86) PCT No.: PCT/JP99/03840

§ 371 (c)(1), (2), (4) Date: Jun. 6, 2000

(87) PCT Pub. No.: WO00/05514

PCT Pub. Date: Feb. 3, 2000

(65) Prior Publication Data

US 2002/0173363 A1 Nov. 21, 2002

(30) Foreign Application Priority Data

Jul. 22, 1998 (JP) .......................................... 10-206773

(51) Int. Cl.$^7$ ................................................ F16D 3/20
(52) U.S. Cl. .................... 464/182; 403/359.6
(58) Field of Search ................... 464/182, 905, 464/906, 111, 145; 403/359.1, 359.2, 359.5, 359.6, DIG. 7, DIG. 14, 298

(56) References Cited

U.S. PATENT DOCUMENTS

| | | | | |
|---|---|---|---|---|
| 1,905,277 A | * | 4/1933 | Ewert | 403/359.2 |
| 2,297,390 A | | 9/1942 | Burger | |
| 3,722,929 A | * | 3/1973 | Gilman | 403/359.6 |
| 3,750,489 A | * | 8/1973 | Caldwell | 403/DIG. 7 |
| 3,832,076 A | * | 8/1974 | Gehrke | 403/359.5 |
| 4,224,806 A | * | 9/1980 | Kobayashi | 464/111 |
| 4,338,796 A | * | 7/1982 | Orain | 464/905 X |
| 4,606,671 A | * | 8/1986 | Rasmussen | 403/359.5 |
| 4,608,028 A | | 8/1986 | Welschof et al. | |
| 4,786,270 A | * | 11/1988 | Iwasaki | 464/905 |
| 5,536,101 A | * | 7/1996 | Schwarzler et al. | 403/359.5 X |
| 5,643,092 A | * | 7/1997 | Girguis | 403/359.5 X |
| 5,779,551 A | | 7/1998 | Stall et al. | |
| 5,816,113 A | * | 10/1998 | Fohl | 403/359.5 X |
| 5,899,814 A | * | 5/1999 | Murillo | 464/145 X |
| 6,457,743 B1 | * | 10/2002 | Steffens, Jr. | 403/359.1 X |

FOREIGN PATENT DOCUMENTS

| | | | |
|---|---|---|---|
| CH | 561 974 | * | 5/1975 |
| WO | WO 98/54476 | | 12/1998 |

OTHER PUBLICATIONS

Abstract of Japanese Patent Publication No. 09068233; dated Mar. 11, 1997.

* cited by examiner

Primary Examiner—Greg Binda
(74) Attorney, Agent, or Firm—Arent Fox Kintner Plotkin & Kahn, PLLC (57) ABSTRACT

A shaft member 1 and an outer peripheral member 2 disposed on the outer periphery of the shaft member 1 are joined together by splines 3 through which the teeth 31 of the shaft member 1 and the teeth 32 of the outer peripheral member 2 are fitted together. At one axial end of each spline 3, a trough 31 in the tooth 31 of the shaft member 1 is diametrically increased to provide a diametrically increased region S1. In this diametrically increased region S1, there is defined a fit region F for the tooth 31 of the shaft member 1 and the tooth 32 of the outer peripheral member 2.

15 Claims, 13 Drawing Sheets

| Characteristics | Surface hardness | | |
|---|---|---|---|
| | HRc42 | HRc52 | HRc59 |
| Torsional strength | Reference | 33% increase | 17% increase |
| Number of cycles till fatigue fracture occurs | Reference | 3.6 times | 12.8 times |

FIG.4(B)

| Characteristics | Hardening ratio | | | | |
|---|---|---|---|---|---|
| | 0.25 | 0.35 | 0.45 | 0.55 | 0.65 |
| Torsional strength | Reference | 9% increase | 17% increase | 16% increase | 16% increase |
| Number of cycles till fatigue fracture occurs | Reference | 1.92 times | 2.13 times | 1.73 times | 1.16 times |

| Characteristics | Type | |
| --- | --- | --- |
| | Fig.6 type | Fig.7 type |
| Torsional strength | Reference | 11.5% increase |
| Number of cycles till fatigue fracture occurs | Reference | 2.7 times |

Load shear stress in fatigue test;

±665Mpa (67.8 kgf/mm$^2$)

FIG.13

| Characteristics | Type | | |
| --- | --- | --- | --- |
| | FiG.7 type | Fig.8 type | Fig.9 type |
| Torsional strength | Reference | 17% increase | 13% increase |
| Number of cycles till fatigue fracture occurs | Reference | Same as the reference | Same as the reference |

Load shear stress in fatigue test;

±665Mpa (67.8 kgf/mm$^2$)

FIG.14

| Specification | Parts | |
|---|---|---|
| | Shaft | Boss |
| D.P | 32/64 | 32/64 |
| Pressure angle | 37.5° | 37.5° |
| Number of teeth | 26 | 26 |
| PCD | 20.638 | 20.638 |
| Large diameter | 21.438 | 21.858 |
| Small diameter | 19.357 | 20.015 |

Boss; SCR420 steel, carburized and tempered

Shaft; S40C steel, induction-hardening and tempered, surface hardness; HRc58, hardening ratio; 0.40

POWER TRANSMISSION MECHANISM

BACKGROUND OF THE INVENTION

The present invention relates to a power transmission mechanism for transmission of torque between two members.

Transmission shafts for transmission of power (torque or rotation) are used in many machine parts in automobiles and industrial machines. Some shafts are solid and others hollow, these being produced by direct cutting or plastic working of bar or pipe material or, in recent years, by the sintering of powder.

Spline shafts or serrated shafts for transmission of high torque are generally formed by subjected medium carbon steel or low alloy steel (case hardening steel, nitrided steel or the like) to a heat treatment, such as surface hardening process or tempering, for example, carburization hardening, high frequency hardening or nitriding, so as to increase the shaft strength in consideration of plastic workability, machinability and cost, it being only after such treatment that these shafts are put to use. Further, recently, use has been made of non-refine steel to dispense with refining, or a material subjected to high alloying or high purifying (reduction of inclusions, reduction of P, i.e., phosphorus, etc.) to increase strength, or a material subjected to shot peening to increase fatigue strength.

Figure 5:
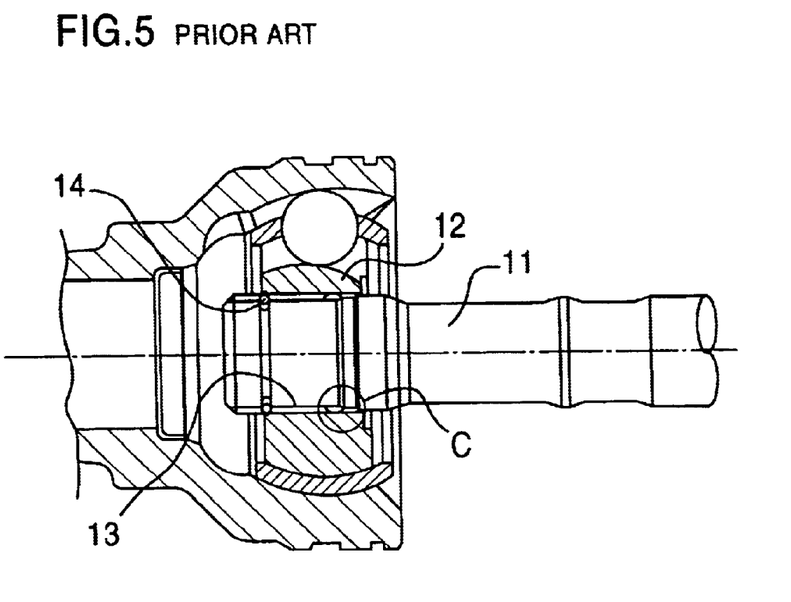
FIG. 5 is an axial section of a constant velocity joint having a power transmission mechanism.

FIG. 5 shows an example of a machine part having said transmission shaft, which is a constant velocity joint used in the drive shaft of an automobile. This constant velocity joint includes a shaft member 11 having an inner ring 12 fitted thereon through splines 13 formed on the outer periphery of said shaft member 11, the torque in the shaft member 11 being transmitted to the inner ring 12 through the groove-and-ridge fit of the splines 13.

Figure 6:
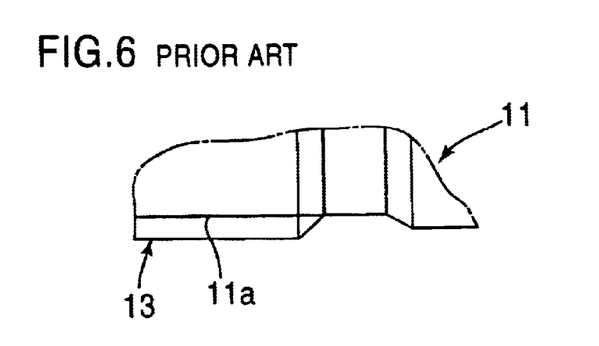
FIG. 6 is an axial section showing an example of the shape of the terminal end (C in FIG. 5) of a spline shaft.
Figure 7:
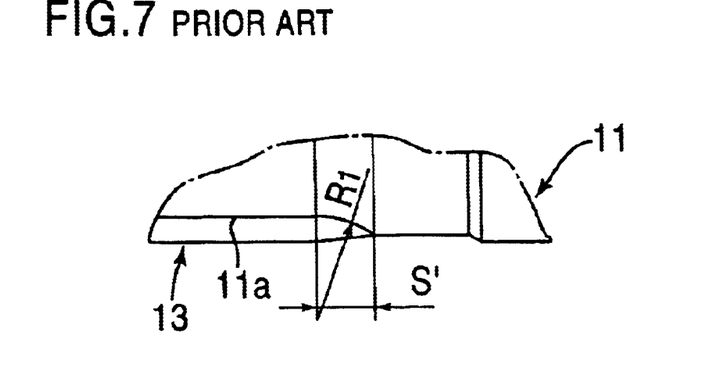
FIG. 7 is an axial section showing an example of the shape of the terminal end (C in FIG. 5) of a spline shaft.
Figure 8:
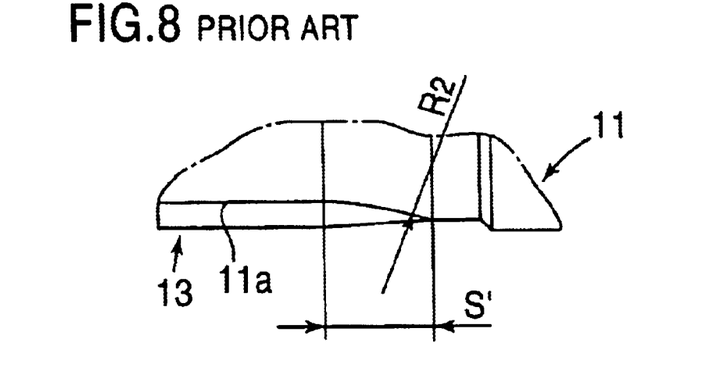
FIG. 8 is an axial section showing an example of the shape of the terminal end (C in FIG. 5) of a spline shaft.
Figure 9:
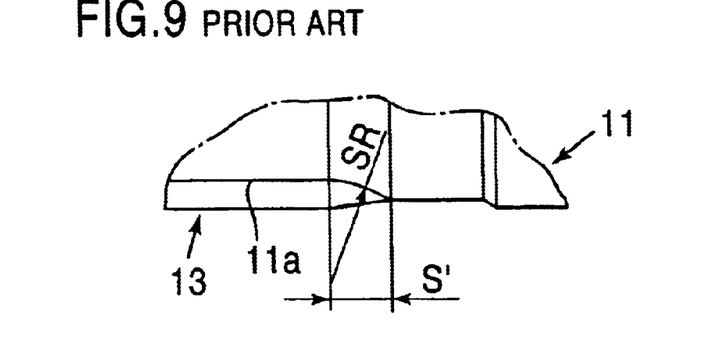
FIG. 9 is an axial section showing an example of the shape of the terminal end (C in FIG. 5) of a spline shaft.

In this connection, there are various types as to the shaft of the spline terminal end side (C in the figure) of the shaft member 11—the "terminal end side" means the opposite side when the shaft end surface which, when the shaft member 11 is inserted in the inner ring 12, is the first to fit in the inner ring 12 is taken as the inlet side. FIGS. 6 through 9 show examples thereof, FIG. 6 showing a first type (tentatively referred to as the "cut-through type") in which the spline trough 11a of the spline 13 is directly cut through the outer peripheral surface of the shaft member 11, FIGS. 7 through 9 showing a second type (tentatively referred to as the "cut-up type") in which the spline trough 11a is smoothly diametrically increased until it connects to the outer peripheral surface of the shaft member 11. Different forms of the cut-up type are known: one in which the diametrical increase is effected by an arc with a radius R1 (FIG. 7), one in which the diametrical increase is effected by an arc with a greater radius R2 than in FIG. 7 (R2>R1) (see FIG. 8), and one in which the diametrical increase takes a spherical form with a radius SR (see FIG. 9).

Figure 10:
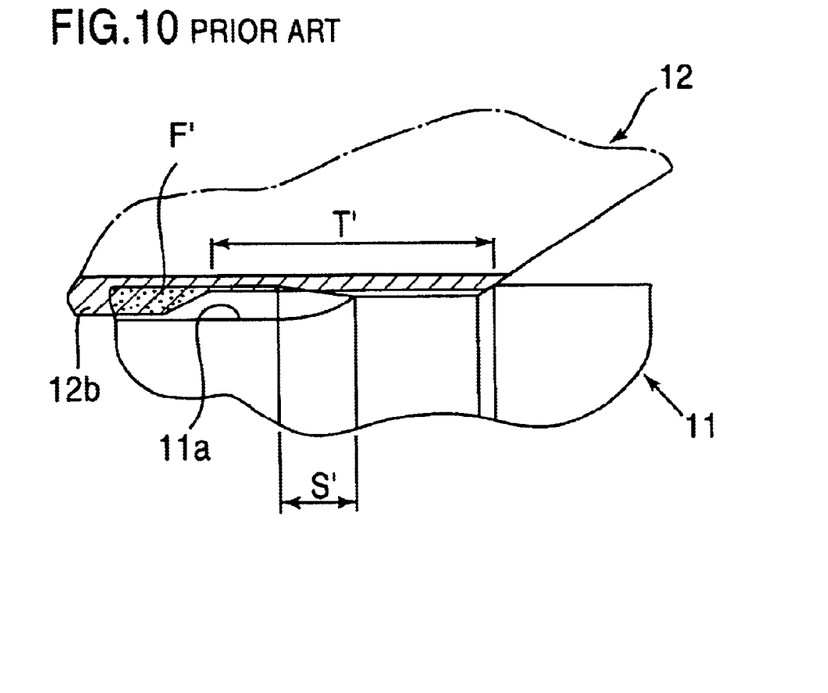
FIG. 10 is an axial section of a conventional power transmission mechanism.

FIG. 10 shows a conventional fit between said shaft member 11 and inner ring 12, wherein a relief region T' where the inner diameter is increased is defined in the inner ring 12 on the terminal end side of the spline ridge 12b, and the portion of the ridge 12b excluding the relief region T is fitted in the portion of the trough 11a excluding the diametrically increased region S' of the shaft member 11, it being arranged that such fitting portion F' (marked with dots) does not enter the diametrically increased region S' of the trough 11a of the shaft member 11.

In recent years, with the global environmental problem being highlighted, it has been required in the automobile industry to tighten emission control and improve fuel efficiency, and as a measure therefor, lightening has been promoted. In automobiles, splines and serrations (hereinafter represented by the term spline shaft) have been used abundantly in such parts as transmissions, differentials, drive shafts, and propeller shafts, it being noted that since the reduction of the weight of the spline shaft contributes much to the lightening of the automobile, there has been a strong need to increase the spline shaft strength, i.e., to increase the strength in two aspect: static strength and fatigue strength.

As for the measures for strengthening and lightening the spline shaft, the aforesaid high alloying or high purifying may be contemplated, but these would not be advantageous from the viewpoint of production cost since they are attended by an increase in the cost of material or a large decrease in workability. Further, shot peening, though effective in improving the fatigue strength, is not observed to provide sufficient merits as to static strength; rather, it leads to high cost.

Figure 12:
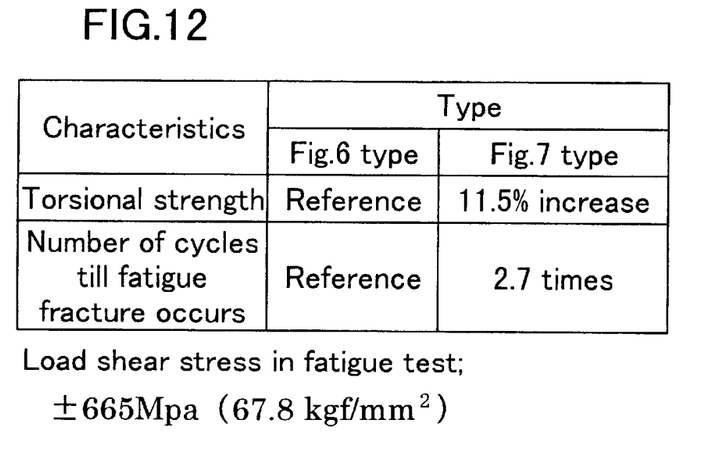
FIG. 12 is a table showing strength comparison data on the spline shafts shown in FIGS. 6 and 7.
Figure 13:
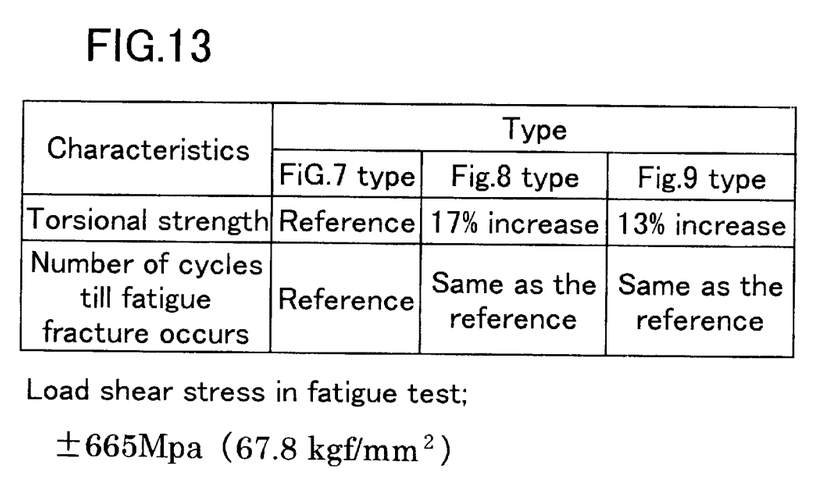
FIG. 13 is a table showing strength comparison data on the types shown in FIGS. 7, 8 and 9.

A spline shaft whose terminal end is increased in diameter in a large arc form (FIG. 8) or in a spherical form (FIG. 9), though improved in static strength as compared with the type shown in FIG. 7, is not observed to provide sufficient merits in increasing the fatigue strength, as can be seen from the test results shown in FIG. 13. Further, since working tools (hob cutters, rolling racks, etc.) have to be newly produced, a cost increase is incurred. On the other hand, the cut-through type shown in FIG. 6 is not suitable for weight reduction measures, since it is inferior to the cut-up type shown in FIG. 7 in both static strength and fatigue strength, as is clear also from the experimental results shown in FIG. 12.

As described above, the conventional measures for weight reduction are confronted with problems in either cost or strength and there has been no measure that has successfully satisfied both of the requirements at one time.

Accordingly, an object of the present invention is to make it possible to achieve improvements in the static strength and fatigue strength of a spline shaft or serrated shaft without incurring an increase in costs.

SUMMARY OF THE INVENTION

Figure 11:
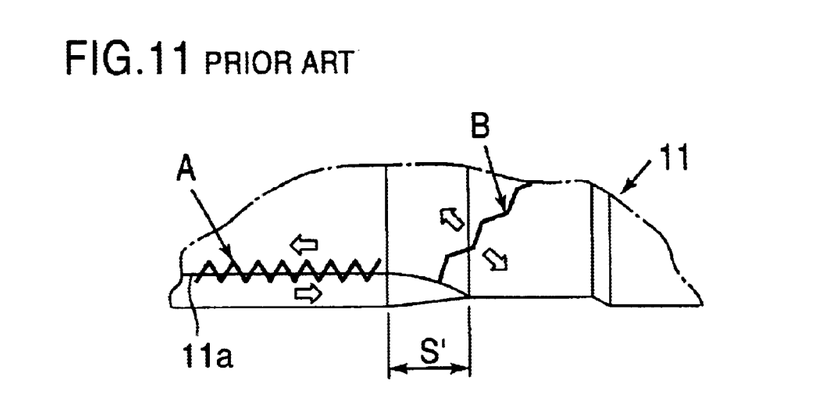
FIG. 11 is a section showing the torsional fracture mode of a spline shaft.
Figure 14:
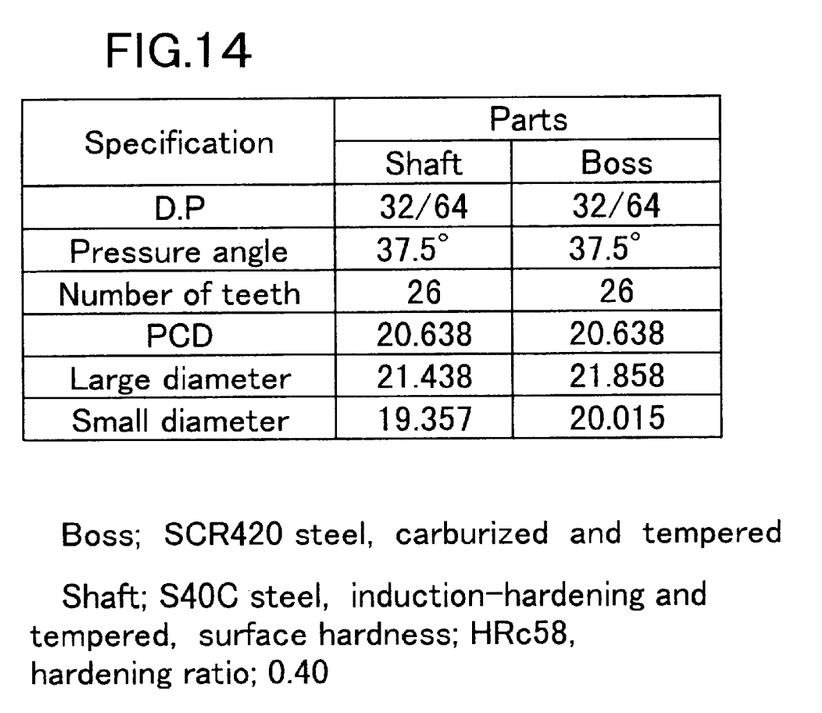
FIG. 14 is a table showing the specifications of samples used to test a spline shaft for torsional strength.

The boss of the inner ring was fitted on a spline shaft of the type shown in FIG. 7 whose troughs were diametrically increased by an arc (for the specifications of the spline shaft, see FIG. 14), and this assembly was put to torsion test to examine and analyze the fracture mode. As a result, it was found that as shown in FIG. 11, the fracture comprised two main fracture planes A and B: a first fracture plane extending along the bottom of the trough 11a of the shaft member 11 (A: axial fracture plane), and a second fracture plane inclined at an angle of 45° with respect to the axis (B: main stress fracture plane). It is believed that the axial fracture plane A is a shear fracture plane due to an axially-acting shearing force and that the main fracture plane B is a tensile fracture plane due to torsional main stress.

Figure 15A:
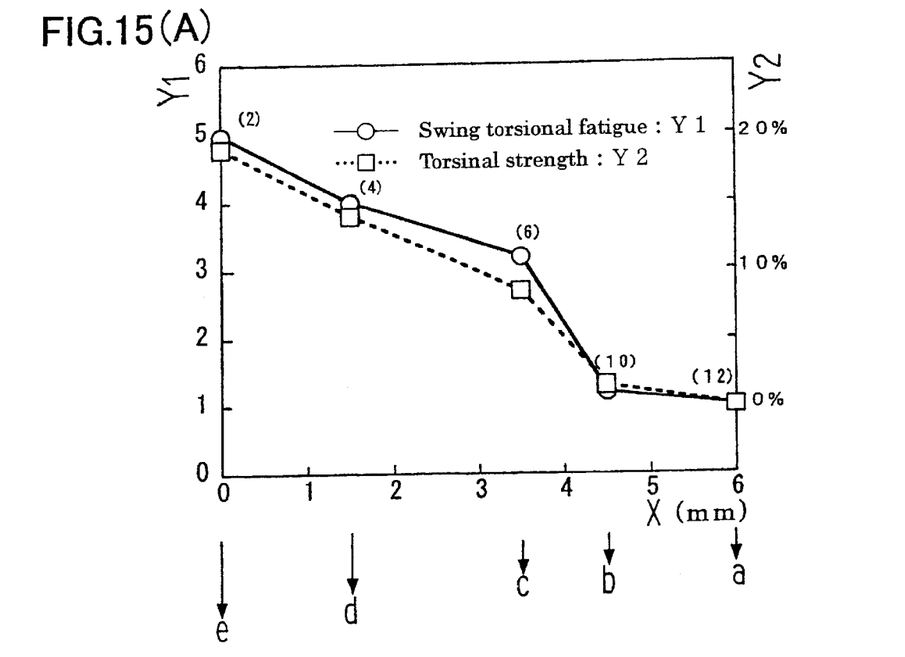
FIG. 15(A) is a graph showing the results of torsional strength tests.
Figure 15B:
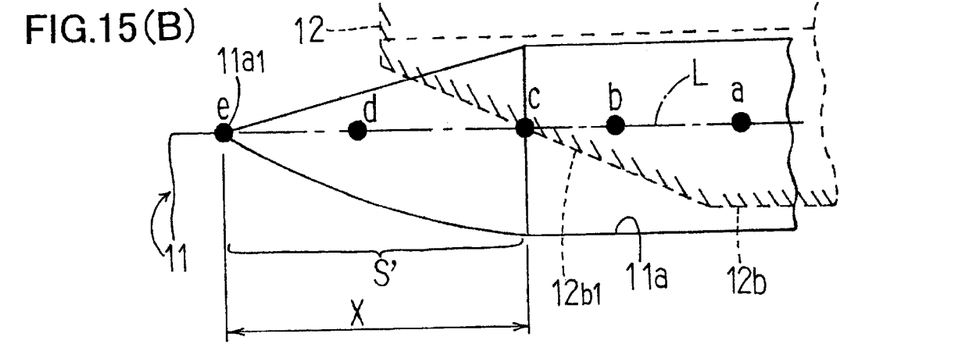
FIG. 15(B) is an enlarged section of a power transmission mechanism for explaining FIG. 15(A)

Next, the fit position of the boss was axially stepwise shifted and the strength of the spline shaft was measured at each shifted position; the results shown in FIG. 15(A) were obtained. The horizontal axis in this figure represents the position X [mm] at which the boss is fitted, and the left-hand vertical axis represents a ratio Y1 of repetition till the occurrence of fatigue fracture (the load shear stress is set to ±665 MPa [67.8 kgf/mm²] and the right-hand vertical axis represents the rate of increase Y2 [%] in torsional break strength. The X on the horizontal axis, as shown in (B) of the same figure, indicates the distance from the terminal end 11a1 of the trough 11a of the shaft member 11 to the point (●) where the terminal end outline 12b1 of the ridge 12b of the boss 12 crosses the outer periphery level L of the shaft member 11. Measurements were conducted at positions X=a, b, . . . e, the repetition ratio Y1 and rate of increase Y2 being determined with the position a (X=6 mm) used as a reference (Y1=1, Y2=0). Further, (2), (4), (6), (10), and (12) in FIG. 15(A) indicate axial shear crack lengths [mm].

It is seen from FIG. 15(A) that the more the fit position of the boss is shifted toward the terminal end (left-hand side of the figure) of the shaft member 11, the more the axial shear fracture plane (axial shear crack) decreases, thus increasing the strength. The reason, as it is believed, is that the portion of the spline (non-fit portion) which is not fitted to the boss during the torsion test is locally twisted and that if the length of the non-fit portion is decreased, the local twist decreases and so does the shear stress acting on the trough of the shaft in the non-fit portion.

It is seen from FIG. 15(A) that the static strength and fatigue strength sharply increase after the boss has reached a particular fit-position which is immediately in front of the terminal end of the spline shaft. The critical position where the fatigue strength sharply increases lies in a region between the points b and c in (B) of the same figure, said region roughly coincides with the position where the terminal end rise portion 12b1 of the ridge 12b of the boss starts to cross the diametrically increased region S' of the trough 11a of the shaft member 11 (the position where the rise portion 12b1 of the ridge 12b starts to fit in the trough 11a in the diametrically increased region S').

It is believed that the reason is that in addition to the decrease in the shear stress in the tooth bottom of the non-fit region described above, in the diametrically increased region S' the trough 11a is diametrically increased, resulting in the tooth bottom being diametrically increased, so that the stress in this portion is decreased.

The present invention, which is based on the view described above, is intended to provide a power transmission mechanism wherein a shaft member and an outer peripheral member disposed on the outer periphery of said shaft member are connected for mutual torque transmission by a fit between the teeth of the shaft member and the teeth of the outer peripheral member and the troughs of the teeth of the shaft member are increased in diameter at least at one axial end, said power transmission mechanism being characterized in that in the diametrically increased regions of said troughs, there are fit regions for the teeth of the shaft member and the teeth of the outer peripheral member. In this case, the shaft member and the outer peripheral member are connected by splines or serrations.

In the diametrically increased region of said trough, if the trough in the tooth of the shaft member is kept in contact with the ridge of the tooth of the outer peripheral member, then the fit region is provided with a sufficient area to greatly increase the strength. In this case, if an arcuate chamfer is provided on the ridge of the tooth of the outer peripheral member in contact with the trough in the tooth of the shaft member, it is possible to bring the two in surface contact with each other in the diametrically increased region, and the increased area of the fit region provides a further increase in strength.

Further, the ridges of the teeth of the outer peripheral member may be brought into contact with the large diameter end (the terminal end) of the diametrically increased region of said trough, thereby providing a sufficient area for the fit region, achieving a large increase in the shaft strength. In this case, it is preferable to provide a restricting means for preventing the outer peripheral member from moving toward the other axial end to serve as a means for preventing the rattling of the outer peripheral member.

Such restricting means may be composed of a forcing means for forcing the outer peripheral member toward one axial end or a pressing means by which the teeth of the shaft member and the teeth of the outer peripheral member are circumferentially pressed against each other.

As described above, according to the invention, it is possible to greatly increase the static strength and fatigue strength of a spline shaft or serrated shaft. Furthermore, there are no such drawbacks as decreased workability and increase in costs, as in the case of using high alloy steel or highly purified steel, nor is there a marked increase in facility introducing cost as in the case of shot peening. Thus, reduction in the cost and weight of the spline shaft is made possible and in the present invention it is possible to achieve, for example, a 12% reduction in weight since a 19% increase in strength can be achieved.

DESCRIPTION OF THE PREFERRED EMBODIMENTS

An embodiment of the invention will now be described with reference to FIGS. 1 through 22.

Figure 1:
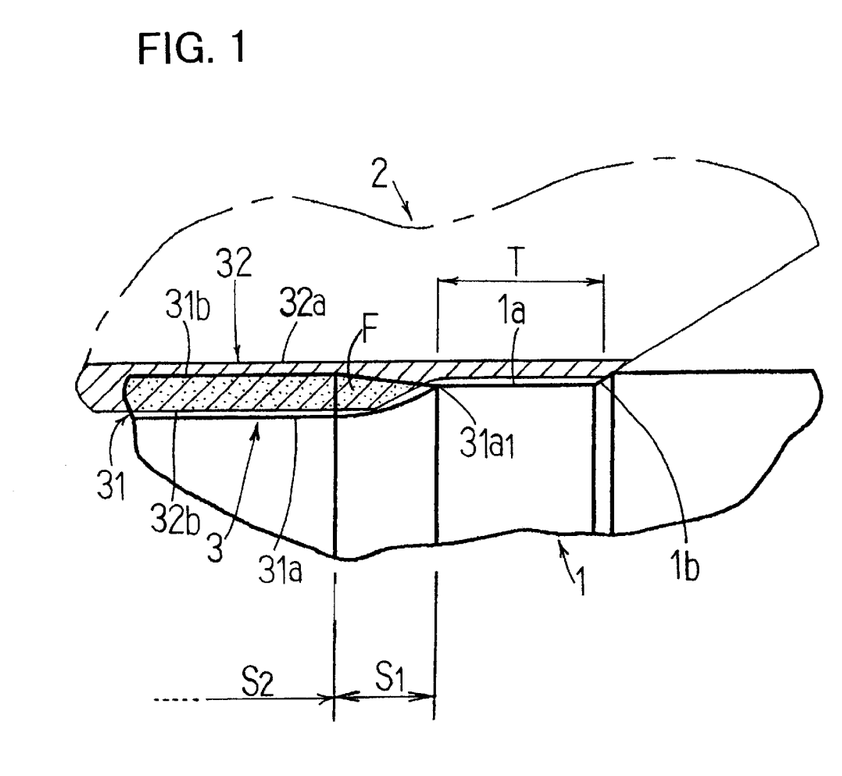
FIG. 1 is an axial section of a power transmission mechanism according to the invention.

As shown in FIG. 1, a power transmission mechanism according to the present invention comprises a shaft member 1 and an outer peripheral member 2, such as a boss, disposed on the outer periphery of the shaft member 1, said members being joined together by splines 3 (or serrations) through which the teeth 31 of the shaft member 1 and the teeth 32 of the outer peripheral member 2 are fitted together. The teeth 31 and 32 extend axially.

Figure 2:
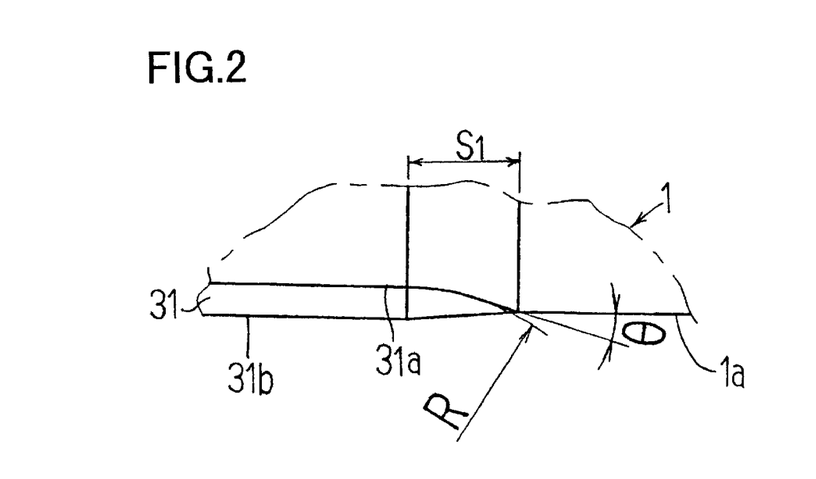
FIG. 2 is an axial section showing another embodiment of the invention.

Of a trough 31*a* and a ridge 31*b* in a tooth 31 formed on the outer periphery of the shaft member 1, the terminal end (right-hand side in FIG. 1) of the trough 31*a* has a diametrically increased region S1 which is smoothly diametrically increased by an arc, and at the terminal end of said diametrically increased region S1, the trough 31*a* connects to the outer peripheral surface of the plain portion 1*a* (formed adjacent the terminal end of the serration 3) of the shaft member 1. On the other hand, the terminal end of the ridge 31*b* of the shaft member 1 is slightly diametrically decreased and connects to the outer peripheral surface of the plain portion 1*a* of the shaft member 1 at the same place as the terminal end 31*a*1 of the trough 31*a*. From the viewpoint of the strength of the shaft member 1, it is desirable that the outer diameter of the plain portion 1*a* be equal or approximately equal to the outer diameter of the ridge 31*b* of the shaft member 1. The trough 31*a* in the diametrically increased region S1, which is formed by an arc alone, may be formed by a combination of an arc and a straight line (the arc being disposed at the inlet side), as shown in FIG. 2.

The outer peripheral member 2 is positioned relative to the shaft member 1 in that the inner diametrical end of the terminal side abuts against a shoulder 1*b* formed on the outer periphery of the shaft member 1 and in that the inner diametrical end of the inlet side (left-hand side in the figure) is locked by a stop ring (14: see FIG. 5). Of a trough 32*a* and a ridge 32*b* in a tooth 32 (indicated by hatching) formed on the inner periphery of the outer peripheral member 2, the trough 32*a* is formed straight to the terminal end of the outer peripheral member 2 with the same diameter maintained. On the other hand, the terminal end of the ridge 32*b* leads to a relief region T having a greater inner diameter than at the inlet side via an inclined rise portion 32*b*1. The inner diameter of the relief region T is greater than the outer diameter of the plain portion 1*a* of the shaft member 1 but smaller than the outer diameter of a shoulder portion 1*b* of the shaft member 1.

In the present invention, the fit region F (marked with dots) for the tooth 31 of the shaft member 1 and the tooth 32 of the outer peripheral member 2 is defined not only in the spline effective region S2 (which refers to the trough excluding the diametrically increased region S1) but also in the diametrically increased region S1, so as to allow both teeth 31 and 32 to circumferentially contact each other in the diametrically increased region S1. This is sharply contrasted with the conventional article shown in FIG. 10 in which the fit region F' is defined excluding the diametrically increased region S' of the trough 31*a*. Further, the fit region F, as shown in FIG. 1, is located radially inwardly of an outer periphery of the shaft member 1.

Figure 3:
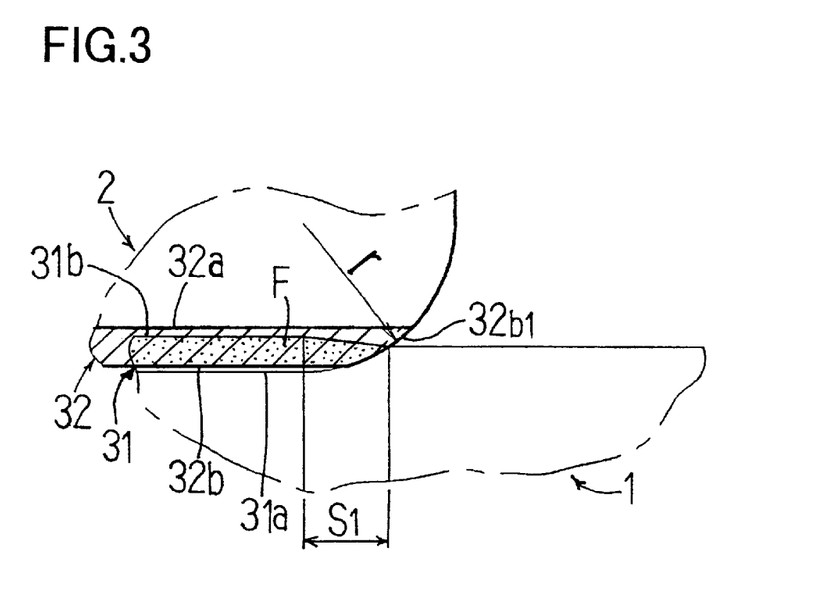
FIG. 3 is an axial section showing another embodiment of the invention.

Such arrangement makes it possible to increase the static strength and fatigue strength of the shaft member 1 for the reason described above. To increase strength, the position in which the outer peripheral member 2 is fitted on the shaft member 1 should be as close to the terminal end as possible and therefore it is preferable that, as shown in FIG. 1, the trough 31*a* in the tooth 31 of the shaft member 1 and the ridge 32*b* of the tooth 32 of the outer peripheral member 2 be in contact with each other in the diametrically increased region S1. In this case, as shown in FIG. 3, if an arcuate chamfer (radius r) is provided on the rise portion 32*b*1 of the ridge 32*b* of the outer peripheral member 2 in contact with the trough 31*a*, a further increase in strength due to an increase in the area of the fit region F is obtained.

Figure 4A:
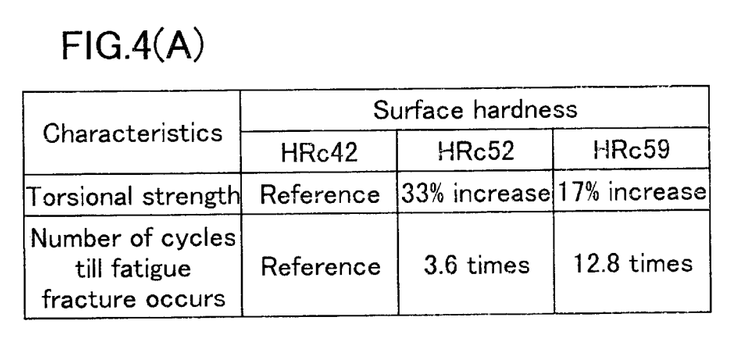
FIG. 4(A) is a table showing the effect of the surface hardness on the torsional strength and fatigue strength, and (B) is a table showing experimental data about the effect of the hardening depth (hardening ratio) on the torsional strength and fatigue strength.
Figure 4B:
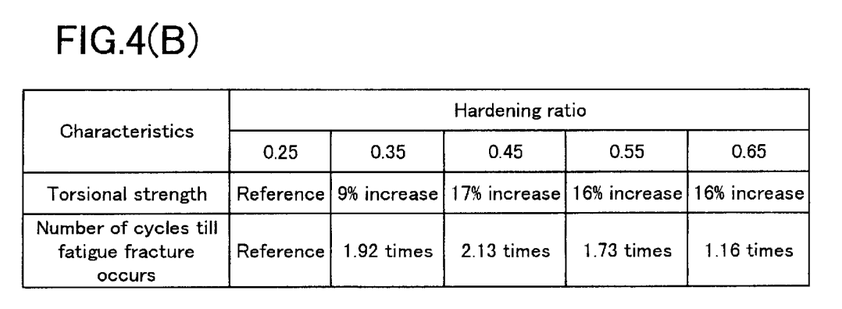

It is preferable to subject the shaft member 1 to a surface hardening treatment, e.g., high frequency hardening. In that case, the higher the surface hardness, the more desirable, as is apparent from FIG. 4(A), and it is preferable to aim at the highest hardness for the material to be used. As for the hardening depth, it is preferable to aim at 0.5 or thereabouts in terms of the hardening ratio (the depth till the effective depth/shaft radius) (see FIG. 4(B)).

Besides this, shot peening may be applied to the shaft member 1 to further increase the fatigue strength or the existing measures for increased strength may be taken; for example, the diametrically increased region S' of the trough 31*a* may be formed of a large arc as shown in FIG. 8 or the trough 31*a* of the diametrically increased region S' may be spherically formed as shown in FIG. 9.

Figure 16:
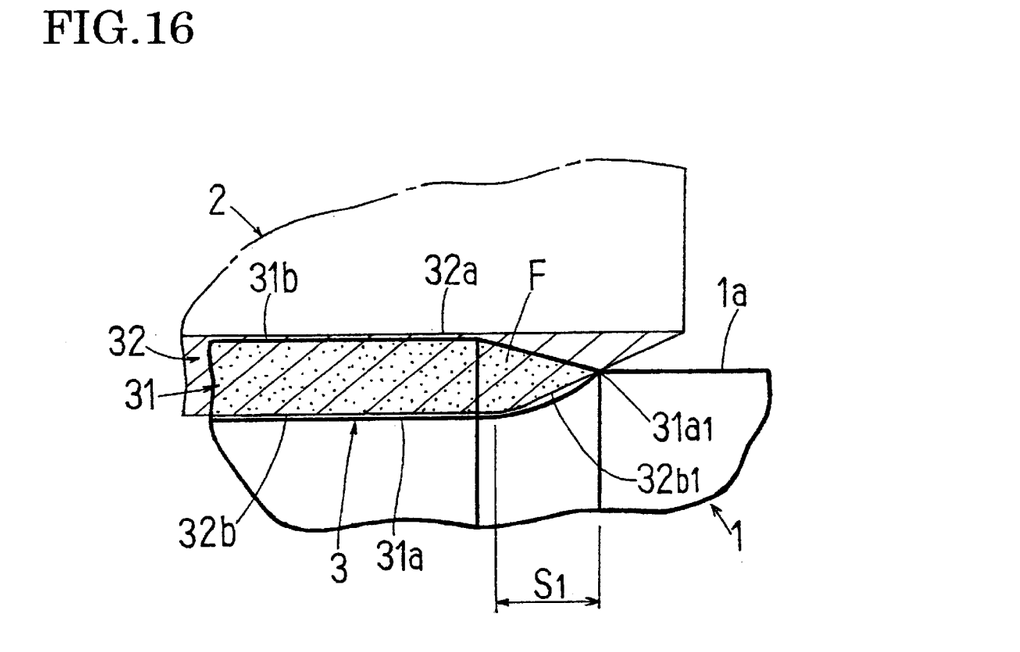
FIG. 16 is an axial section showing another embodiment of the invention.
Figure 17:
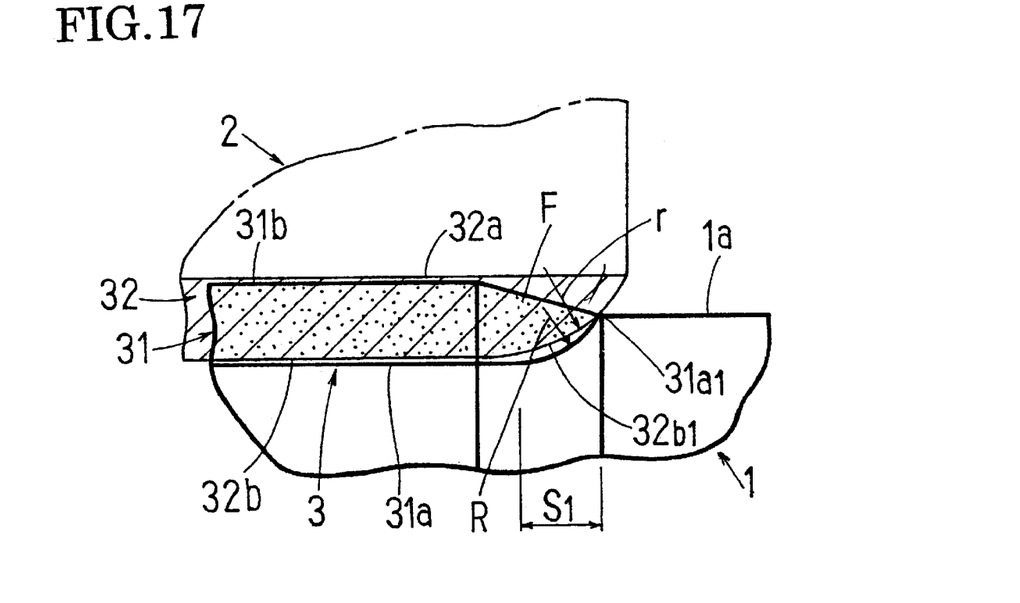
FIG. 17 is an axial section showing another embodiment of the invention.

FIG. 16 shows an example in which, in the tooth 31 of the shaft member 1, the terminal end (large end) 31*a*1 of the diametrically increased region S1 of the trough 31*a* is in contact with the ridge 32*b* of the tooth 32 of the outer peripheral member 2, particularly the rise portion 32*b*1, in taper form, at the terminal end, thus increasing the strength (static and fatigue strength) of the shaft member 1 in the same manner as in FIG. 1. FIG. 17 shows an arrangement wherein in the tooth 32 of the outer peripheral member 2, the rise portion 32*b*1 at the terminal end of the ridge 32*b* is formed with an arcuate chamfer and the curvature r of the chamfer is made greater than the curvature R of the diametrically increased region S1 of the trough 31 to bring the rise portion 32*b*1 into contact with the terminal end 31*a*1 of the trough 31*a* in the same manner as in FIG. 16. In either case, the contact between the rise portion 32*b*1 and the terminal end 31*a*1 results in the outer peripheral member 2 being positioned at the axial terminal end, thus preventing the outer peripheral member 2 and the shoulder 1*b* of the shaft member 1 from contacting each other.

Figure 18:
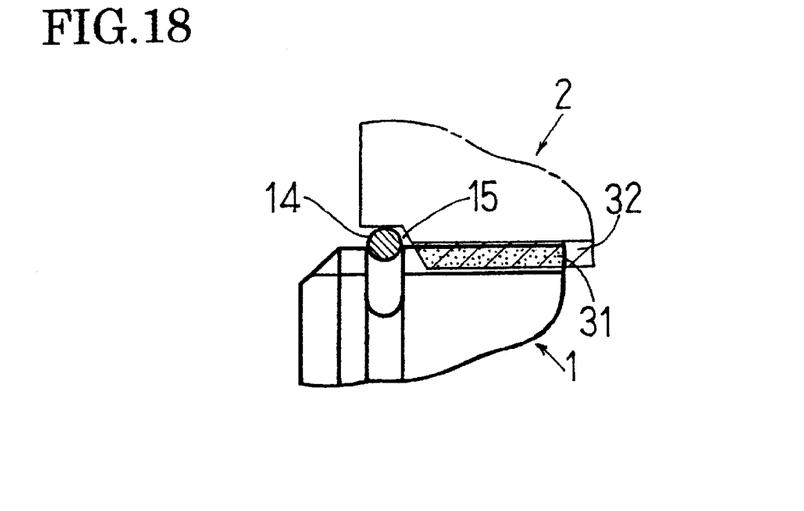
FIG. 18 is an axial section showing the fixing construction of an outer peripheral member.

As described above, the outer peripheral member 2 is fixed with respect to the shaft member 1 by locking the inner diameter end at the inlet by a stop ring 14. In this case, owing to errors in processing or the like, a clearance 15 could be produced between the inner diameter end at the inlet of the outer peripheral member 2 and the stop ring 14, as shown in FIG. 18, sometimes causing the outer peripheral member 2 to rattle axially. Such rattling would make it impossible to hold the relation X=0 in the construction shown in FIGS. 16 and 17, causing a variation in shaft strength.

Figure 19:
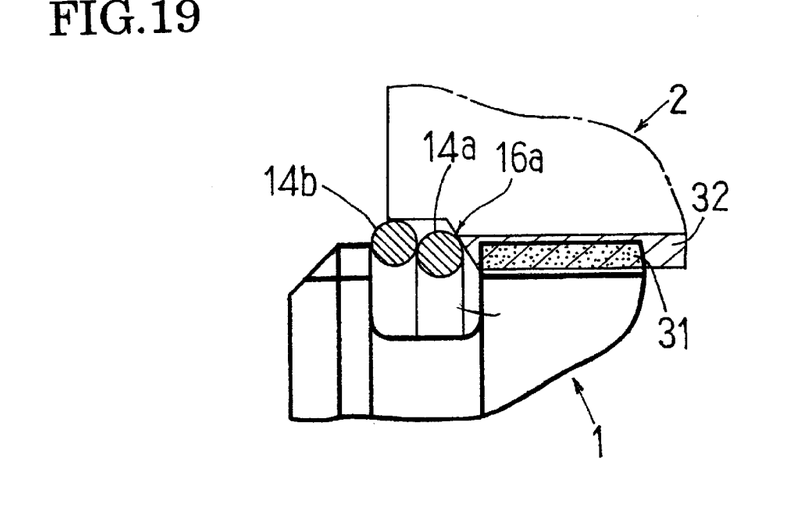
FIG. 19 is an axial section showing a restricting means.
Figure 20:
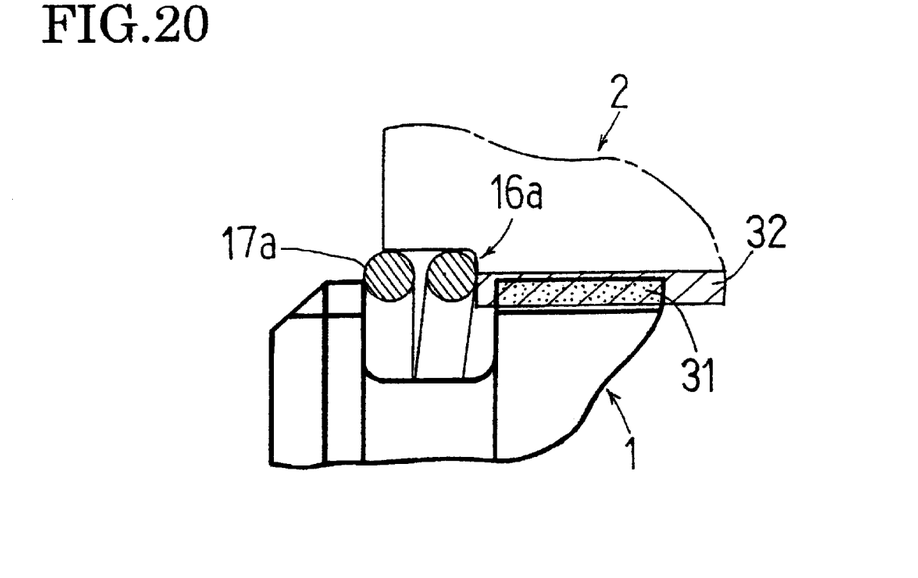
FIG. 20 is an axial section showing a restricting means.
Figure 21:
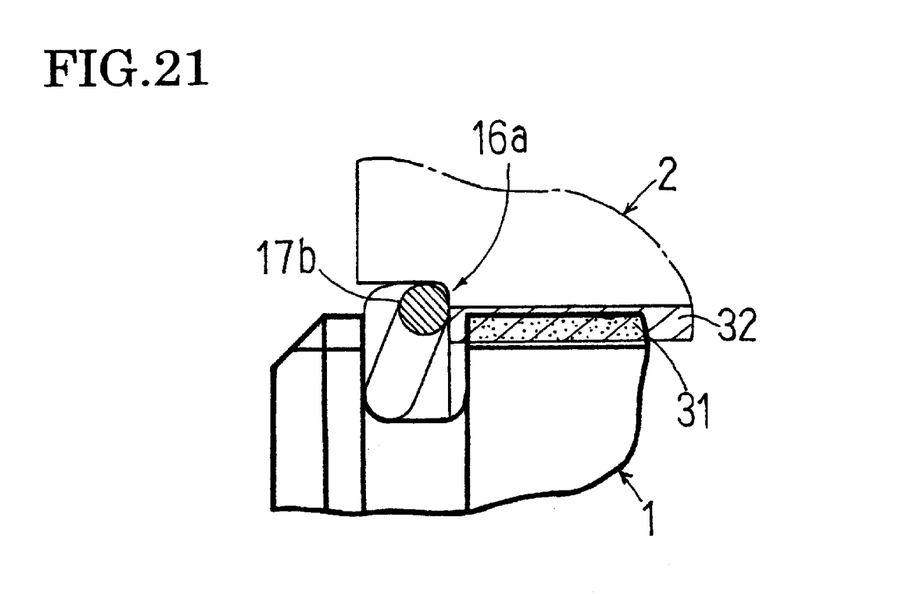
FIG. 21 is an axial section showing a restricting means.
Figure 22:
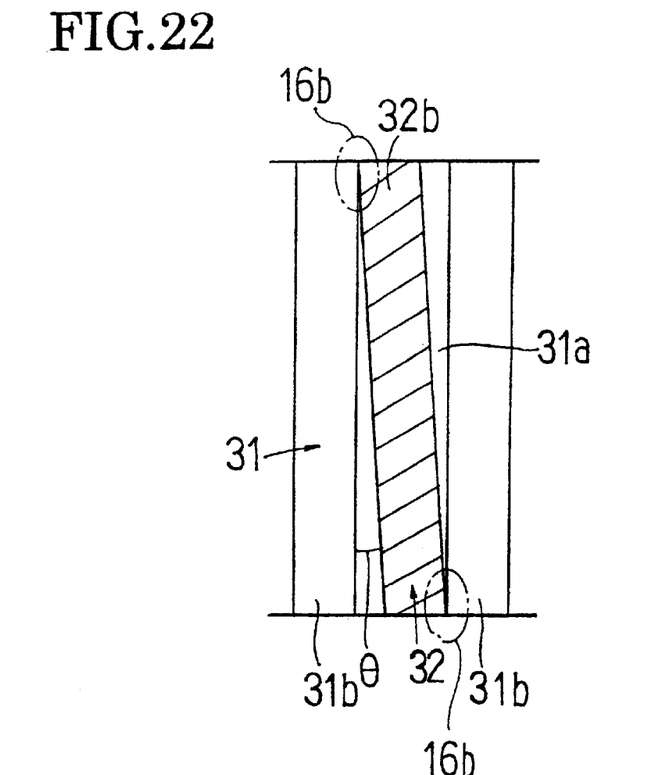
FIG. 22 is a circumferential section showing a restricting means.

To avoid this, it is preferable, as shown in FIGS. 19–22, to provide restricting means 16*a*, 16*b* between the shaft member 1 and the outer peripheral member 2 for preventing the outer peripheral member 2 from moving toward the other axial end (toward the inlet). The restricting means 16a, 16b may be composed of a forcing means 16a for forcing the outer peripheral member 2 toward one axial end (terminal end) and a pressing means 16b for circumferentially pressing the tooth 31 of the shaft member 1 and the tooth 32 of the outer peripheral member 2 against each other. FIGS. 19–21 show examples of the forcing means 16a; FIG. 19 shows a construction (double clip system) in which two stop rings 14a, 14b are disposed in the pressed state, with one stop ring 14a serving to prevent slip-off of the outer peripheral member 2, with the other stop ring 14b serving to prevent the shaft member 1 and the outer peripheral member 2 from rattling; FIGS. 20 and 21 show a construction in which the stop ring 14 is replaced by elastic members 17a, 17b in the compressed state (FIG. 20 showing a coil spring system using a coil spring 17a, FIG. 21 showing a waved washer system using a waved washer 17b), the elastic force thereof being used to apply a preload on the outer peripheral member 2 that is axially directed toward the terminal end. As pressing means 16b, there may be a construction as shown in FIG. 22, for example. In FIG. 22, the tooth 31, 32 of the shaft member 1 or outer peripheral member 2 is provided with a twist angle θ (exaggerated in the figure showing the ridge 32b of the tooth 32 of the outer peripheral member 2 provided with a twist angle θ) and the shaft member 1 is force-fitted into the outer peripheral member 2 until X=0 as reflected in FIG. 15 (B) in conjunction with FIG. 15 (A), i.e., point e.

The restricting means 16a, 16b, as shown in FIGS. 1 and 3, may be likewise applied when the trough 31a of the tooth 31 of the shaft member 1 and the ridge 32b of the tooth 32 of the outer peripheral member 2 are contacted with each other in the diametrically increased region S1 (in this case, the outer peripheral member 2 and the shoulder 1b of the shaft member 1 may be prevented from contacting each other in the same manner as in FIGS. 16 and 17).

What is claimed is:

1. A constant velocity joint comprising:
    a shaft member; and
    an inner ring disposed on an outer periphery of the shaft member,
    wherein the outer periphery of the shaft member is provided with,
        teeth adapted to fit in teeth of the inner ring, and
        a plain portion,
    wherein said shaft member and the inner ring are thereby connected for mutual torque transmission,
    wherein troughs of the teeth of the shaft member are increased in diameter at least at one axial end of the troughs, defining diametrically increased regions, and a terminal edge of a ridge of the shaft member is diametrically decreased and connected to the plain portion, and
    wherein fit regions for fitting in the teeth of the inner ring are formed in said diametrically increased regions of the troughs of the teeth of the shaft member, said fit regions being located radially inwardly of an outer periphery level of the plain portion.

2. A constant velocity joint as set forth in claim 1, wherein in the diametrically increased regions of the troughs, the troughs of the teeth of the shaft member and ridges of the teeth of the inner ring are in contact with each other.

3. A constant velocity joint as set forth in claim 2, wherein ridges of the teeth of the inner ring that are in contact with the troughs of the teeth of the shaft member are formed with arcuate chamfers.

4. A constant velocity joint as set forth in claim 2, including a restricting means for preventing the inner ring from moving toward an opposite axial end opposite to said at least one axial end.

5. A constant velocity joint as set forth in claim 4, wherein the restricting means is composed of a forcing means for forcing the inner ring axially.

6. A constant velocity joint as set forth in claim 4, wherein the restricting means is composed of a pressing means for circumferentially pressing the teeth of the shaft member and the teeth of the inner ring against each other.

7. A constant velocity joint as set forth in claim 1, wherein the ridges of the teeth of the inner ring are in contact with large diameter ends of the diametrically increased regions of said troughs.

8. A constant velocity joint as set forth in claim 7, including a restricting means for preventing the inner ring from moving toward an opposite axial end opposite to said at least one axial end.

9. A constant velocity joint as set forth in claim 8, wherein the restricting means is composed of a forcing means for forcing the inner ring axially.

10. A constant velocity joint as set forth in claim 8, wherein the restricting means is composed of a pressing means for circumferentially pressing the teeth of the shaft member and the teeth of the inner ring against each other.

11. The constant velocity joint according to claim 1, wherein the teeth of the shaft members are formed by rolling.

12. The constant velocity joint according to claim 1, wherein the inner ring is abutted to a shoulder formed on the outer periphery of the shaft member, and the plain portion of the shaft member is between the shoulder and the shaft member's teeth.

13. A power transmission mechanism comprising:
    a shaft member; and
    an outer peripheral member disposed on an outer periphery of said shaft member connected together for mutual torque transmission by a fit between teeth of the shaft member and teeth of the outer peripheral member, the outer peripheral member having a plain portion,
    wherein troughs in the teeth of the shaft member are diametrically increased at least at one axial end,
    wherein a terminal edge of a ridge of the shaft member diametrically decreases and is connected to the plain portion, and
    wherein the diametrically increased regions of said troughs include fit regions for the teeth of the shaft member and the teeth of the outer peripheral member, said fit regions being located radially inward of an outer periphery level of the plain portion.

14. The power transmission mechanism according to claim 13, wherein the teeth of the shaft member are formed by rolling.

15. The power transmission mechanism according to claim 13, wherein the outer peripheral member is abutted to a shoulder formed on the outer periphery of the shaft member, and the plain portion of the shaft member is between the shoulder and the shaft member's teeth.

* * * * *